United States Patent
Meng et al.

(10) Patent No.: US 12,452,176 B2
(45) Date of Patent: Oct. 21, 2025

(54) LOAD BALANCING METHOD FOR MULTI-THREAD FORWARDING AND RELATED APPARATUS

(71) Applicant: Huawei Technologies Co., Ltd., Shenzhen (CN)

(72) Inventors: Xiangjun Meng, Shenzhen (CN); Yunjian Wang, Hangzhou (CN); Lijun Li, Hangzhou (CN); Chunhe Li, Hangzhou (CN); Dingke Xu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 18/533,886

(22) Filed: Dec. 8, 2023

(65) Prior Publication Data

US 2024/0106754 A1    Mar. 28, 2024

Related U.S. Application Data

(63) Continuation of application No. PCT/CN2022/095899, filed on May 30, 2022.

(30) Foreign Application Priority Data

Jun. 10, 2021    (CN) .......................... 202110651243.1

(51) Int. Cl.
*H04L 47/127* (2022.01)
*H04L 47/125* (2022.01)
(Continued)

(52) U.S. Cl.
CPC .......... *H04L 47/125* (2013.01); *H04L 47/626* (2013.01); *H04L 49/70* (2013.01); *H04L 49/9068* (2013.01)

(58) Field of Classification Search
None
See application file for complete search history.

(56) References Cited

U.S. PATENT DOCUMENTS

| | | | |
|---|---|---|---|
| 10,560,394 B2 | 2/2020 | Murugesan et al. | |
| 11,880,726 B1 * | 1/2024 | Ahmadizadeh | G06F 16/2455 |

(Continued)

FOREIGN PATENT DOCUMENTS

| | | |
|---|---|---|
| CN | 101968748 A | 2/2011 |
| CN | 107005531 A | 8/2017 |

(Continued)

*Primary Examiner* — June Sison
(74) *Attorney, Agent, or Firm* — Conley Rose, P.C.

(57) ABSTRACT

A load balancing method for multi-thread forwarding includes determining a first thread and a second thread from a plurality of threads, where the plurality of threads are all used to process data packets in virtual network interface card queues, wherein a load of the first thread is greater than a first threshold, wherein a load of the second thread is less than a second threshold, and wherein the first threshold is greater than the second threshold; determining a first queue from a plurality of virtual network interface card queues corresponding to the first thread, where the first thread is used to process data packets in the plurality of virtual network interface card queues; and switching the first queue to the second thread, so that the second thread processes a data packet in the first queue.

20 Claims, 6 Drawing Sheets

(51) Int. Cl.
*H04L 47/625* (2022.01)
*H04L 49/00* (2022.01)
*H04L 49/90* (2022.01)

(56) References Cited

U.S. PATENT DOCUMENTS

| | | | |
|---|---|---|---|
| 2015/0055456 A1* | 2/2015 | Agarwal | H04L 47/2483 |
| | | | 370/230 |
| 2019/0052530 A1* | 2/2019 | Awal | G06F 9/4893 |
| 2023/0283578 A1* | 9/2023 | Lin | H04L 47/39 |
| | | | 370/412 |
| 2024/0220446 A1* | 7/2024 | Kirubakaran | G06F 9/5044 |
| 2024/0248740 A1* | 7/2024 | Sharma | G06F 9/5088 |
| 2024/0291761 A1* | 8/2024 | K N | H04L 45/586 |

FOREIGN PATENT DOCUMENTS

| | | |
|---|---|---|
| CN | 107368178 A | 11/2017 |
| CN | 108345502 A | 7/2018 |
| CN | 108632165 A | 10/2018 |
| CN | 110286743 A | 9/2019 |
| WO | 2016101099 A1 | 6/2016 |

\* cited by examiner

LOAD BALANCING METHOD FOR MULTI-THREAD FORWARDING AND RELATED APPARATUS

CROSS-REFERENCE TO RELATED APPLICATIONS

This application is a continuation of International Patent Application No. PCT/CN2022/095899 filed on May 30, 2022, which claims priority to Chinese Patent Application No. 202110651243.1 filed on Jun. 10, 2021. The disclosures of the aforementioned applications are hereby incorporated by reference in their entireties.

TECHNICAL FIELD

The present disclosure relates to the field of computer technologies, and in particular, to a load balancing method for multi-thread forwarding and a related apparatus.

BACKGROUND

An OpenFlow virtual switch (OVS) is a multi-layer virtual switch for large-scale network automation through programming extension. A powerful OpenFlow flow table capability of the OVS can resolve service function problems at all layers. Therefore, the OVS is widely used in virtual network forwarding. However, in the cloud computing field, a cluster scale of virtual network nodes is expanding, resulting in an increasingly higher requirement for network performance. In an OVS solution, a hardware network interface card driver works in a kernel mode and relies on a software interrupt to process a packet receiving event. This severely limits forwarding performance.

To resolve a bottleneck problem of network interface card packet receiving performance, a data plane development kit (DPDK) technology emerges based on the OVS. A DPDK is a data plane development tool set that can directly forward user-mode data to a network interface card bypassing a kernel. In an OVS+DPDK solution, a poll mode driver (PMD) thread is responsible for processing data packet sending and receiving on a DPDK data path. The PMD thread periodically polls a virtual network interface card queue. Once a data packet in the virtual network interface card queue is obtained, the data packet is parsed and forwarded.

Currently, the PMD thread is bound to the virtual network interface card queue in advance. Each virtual network interface card queue is bound to a unique corresponding PMD thread, and one PMD thread may be bound to one or more virtual network interface card queues. However, in an actual forwarding scenario, load of the virtual network interface card queue changes continuously, and a fixed binding manner causes load imbalance between PMD threads, and consequently, resources are not fully utilized.

SUMMARY

The present disclosure provides a load balancing method for multi-thread forwarding. A thread with high load and a thread with low load are selected from a plurality of threads that process virtual network interface card queues, and a virtual network interface card queue processed by the thread with high load is switched to the thread with low load. In the way, load balancing between the threads is implemented, full utilization of computing resources is ensured, and computing resource utilization is improved.

A first aspect of the present disclosure provides a load balancing method for multi-thread forwarding, and the method may be applied to a server. The load balancing method for multi-thread forwarding includes: The server determines a first thread and a second thread from a plurality of threads. The plurality of threads is all used to process data packets in virtual network interface card queues, and the plurality of threads may be, for example, PMD threads. Load of the first thread is greater than a first threshold, load of the second thread is less than a second threshold, and the first threshold is greater than the second threshold. When load of a thread is greater than the first threshold, it may be considered that the load of the thread is excessively high. When load of a thread is less than the second threshold, it may be considered that the load of the thread is excessively low.

The server determines a first queue from a plurality of virtual network interface card queues corresponding to the first thread. The first thread is used to process data packets in the plurality of virtual network interface card queues. The first queue may include one or more virtual network interface card queues.

The server switches the first queue to the second thread, so that the second thread processes a data packet in the first queue. After the first queue is switched to the second thread, the first thread is no longer responsible for processing the data packet in the first queue.

In this solution, a thread with high load and a thread with low load are selected from the plurality of threads that process the virtual network interface card queues, and a virtual network interface card queue processed by the thread with high load is switched to the thread with low load. In the way, load balancing between the threads is implemented, full utilization of computing resources is ensured, and computing resource utilization is improved.

In a possible implementation, that the server switches the first queue to the second thread includes: The server marks the first queue as a scheduling mode. The scheduling mode indicates that the first queue is a queue of a to-be-switched thread. When the first queue is marked as the scheduling mode, the server no longer marks the first queue as an interrupt packet receiving mode, so as to ensure that the first queue can be smoothly switched to the second thread subsequently. The server switches the first queue in the scheduling mode from the first thread to the second thread, and the second thread is responsible for processing the data packet in the first queue. The server marks the first queue that is switched to the second thread as a polling packet receiving mode. The polling packet receiving mode indicates the second thread to process the data packet in the first queue in a polling manner.

In this solution, after a virtual network interface card queue of a to-be-switched thread is marked as the scheduling mode, thread switching is performed on the virtual network interface card queue marked as the scheduling mode, so that the virtual network interface card queue can be prevented from being simultaneously processed by the plurality of threads in a thread switching process, and a smooth thread switching process is ensured.

In a possible implementation, that the server determines a first queue from a plurality of virtual network interface card queues corresponding to the first thread includes: The server determines, from the plurality of virtual network interface card queues corresponding to the first thread, one or more virtual network interface card queues marked as the polling packet receiving mode; and the server determines, from the one or more virtual network interface card queues, the first queue that needs to be switched to the second thread.

In a possible implementation, that the server determines a first queue from a plurality of virtual network interface card queues corresponding to the first thread includes: determining a first load amount based on the load of the first thread and the second threshold, where the first load amount is a maximum load amount that can be transferred by the first thread; determining, by the server, a second load amount based on the load of the second thread and the first threshold, where the second load amount is a maximum load amount that can be received by the second thread; and determining, by the server, the first queue based on the first load amount and the second load amount, where both the first load amount and the second load amount are greater than or equal to a load amount corresponding to the first queue. In other words, the load amount corresponding to the first queue is both less than the first load amount and less than the second load amount.

For example, the server may obtain the first load amount by subtracting the second threshold from the load of the first thread. The server may obtain the second load amount by subtracting the load of the second thread from the first threshold.

Comprehensively determining, based on the load of the first thread and the load of the second thread, the queue to be switched to the second thread can ensure that after thread switching of the queue, the load of the first thread does not decrease to less than the second threshold or the load of the second thread does not increase to greater than the first threshold. This ensures that the queue is not switched back and forth between the threads.

In a possible implementation, the method further includes: if a quantity of times that the first thread continuously polls the second queue marked as the polling packet receiving mode is greater than a third threshold, and no data packet is received during a period in which the first thread continuously polls the second queue, marking the second queue as the interrupt packet receiving mode.

The plurality of virtual network interface card queues includes the second queue, and the interrupt packet receiving mode indicates the first thread to trigger processing of a data packet in the second queue after obtaining an interrupt signal from the second queue.

Simply speaking, for the second queue marked as the polling packet receiving mode, if no data packet is received during the period in which the first thread continuously polls the second queue, and the first thread has polled the second queue for a specific quantity of times, it may be considered that there is a high probability that the second queue does not generate a data packet in future. Therefore, the server may change a mode of the second queue that is currently in the polling packet receiving mode to the interrupt packet receiving mode, so that the first thread does not periodically poll the second queue, thereby reducing resource consumption of polling an empty queue, and saving processor resources.

In a possible implementation, the method further includes: if the first thread obtains an interrupt signal from a third queue marked as the interrupt packet receiving mode, marking the third queue as the polling packet receiving mode.

The interrupt packet receiving mode indicates the first thread to trigger processing of a data packet in the third queue after obtaining the interrupt signal from the third queue, and the polling packet receiving mode indicates the first thread to process the data packet in the third queue in the polling manner.

Simply speaking, for the third queue marked as the interrupt packet receiving mode, if the third thread obtains the interrupt signal from the third queue, it may be considered that there is a high probability that the third queue continuously generates a data packet in future. Therefore, the server may change a mode of the third queue that is currently in the interrupt packet receiving mode to the polling packet receiving mode, so that the first thread can periodically poll the third queue, thereby improving processing efficiency of the first thread.

In a possible implementation, the method further includes: obtaining, by the server, load of the plurality of threads in a first time period; predicting, by the server, load of the plurality of threads in a second time period based on the load of the plurality of threads in the first time period, where the second time period is after the first time period; and if the load of the plurality of threads in the second time period is greater than a fourth threshold, creating a new thread, where the new thread is used to process the data packets in the virtual network interface card queues, or if the load of the plurality of threads in the second time period is less than a fifth threshold, deleting a part of threads from the plurality of threads.

In this solution, when it is predicted that load of the plurality of threads is high in a future period of time, the server may create a new thread, so as to timely cope with high service traffic in the future period of time, ensure that the burst service traffic can be processed in a timely and effective manner, and ensure service reliability. When it is predicted that the load of the plurality of threads is low in the future period of time, the server may share a virtual network interface card queue on a thread with lowest load to another thread, and delete the thread, to release processor resources corresponding to the thread and save computing resources.

In a possible implementation, the deleting a part of threads from the plurality of threads includes: determining a to-be-deleted thread and a to-be-reserved thread from the plurality of threads; switching a virtual network interface card queue corresponding to the to-be-deleted thread to the to-be-reserved thread; and deleting the to-be-deleted thread.

In a possible implementation, the load of the first thread includes processor resource utilization corresponding to the first thread.

A second aspect of the present disclosure provides a scheduling apparatus, including an obtaining unit and a processing unit. The processing unit is configured to: determine a first thread and a second thread from a plurality of threads, where the plurality of threads are all used to process data packets in virtual network interface card queues, load of the first thread is greater than a first threshold, load of the second thread is less than a second threshold, and the first threshold is greater than the second threshold; determine a first queue from a plurality of virtual network interface card queues corresponding to the first thread, where the first thread is used to process data packets in the plurality of virtual network interface card queues; and switch the first queue to the second thread, so that the second thread processes a data packet in the first queue.

In a possible implementation, the processing unit is further configured to: mark the first queue as a scheduling mode, where the scheduling mode indicates that the first queue is a queue of a to-be-switched thread; switch the first queue in the scheduling mode from the first thread to the second thread; and mark the first queue that is switched to the second thread as a polling packet receiving mode, where the polling packet receiving mode indicates the second thread to process the data packet in the first queue in a polling manner.

In a possible implementation, the processing unit is further configured to: determine, from the plurality of virtual network interface card queues corresponding to the first thread, one or more virtual network interface card queues marked as the polling packet receiving mode; and determine the first queue from the one or more virtual network interface card queues.

In a possible implementation, the processing unit is further configured to: determine a first load amount based on the load of the first thread and the second threshold, where the first load amount is a maximum load amount that can be transferred by the first thread; determine a second load amount based on the load of the second thread and the first threshold, where the second load amount is a maximum load amount that can be received by the second thread; and determine the first queue based on the first load amount and the second load amount, where both the first load amount and the second load amount are greater than or equal to a load amount corresponding to the first queue.

In a possible implementation, the processing unit is further configured to: if a quantity of times that the first thread continuously polls the second queue marked as the polling packet receiving mode is greater than a third threshold, and no data packet is received during a period in which the first thread continuously polls the second queue, mark the second queue as an interrupt packet receiving mode. The plurality of virtual network interface card queues includes the second queue, and the interrupt packet receiving mode indicates the first thread to trigger processing of a data packet in the second queue after obtaining an interrupt signal from the second queue.

In a possible implementation, the processing unit is further configured to: if the first thread obtains an interrupt signal from a third queue marked as the interrupt packet receiving mode, mark the third queue as the polling packet receiving mode. The interrupt packet receiving mode indicates the first thread to trigger processing of a data packet in the third queue after obtaining the interrupt signal from the third queue, and the polling packet receiving mode indicates the first thread to process the data packet in the third queue in the polling manner.

In a possible implementation, the obtaining unit is configured to obtain load of the plurality of threads in a first time period. The processing unit is further configured to: predict load of the plurality of threads in a second time period based on the load of the plurality of threads in the first time period, where the second time period is after the first time period; and if the load of the plurality of threads in the second time period is greater than a fourth threshold, create a new thread, where the new thread is used to process the data packets in the virtual network interface card queues; or if the load of the plurality of threads in the second time period is less than a fifth threshold, delete a part of threads from the plurality of threads.

In a possible implementation, the processing unit is further configured to: determine a to-be-deleted thread and a to-be-reserved thread from the plurality of threads; switch a virtual network interface card queue corresponding to the to-be-deleted thread to the to-be-reserved thread; and delete the to-be-deleted thread.

In a possible implementation, the load of the first thread includes processor resource utilization corresponding to the first thread.

A third aspect of the present disclosure provides a terminal. The terminal includes a memory and a processor. The memory stores code, and the processor is configured to execute the code. When the code is executed, the terminal performs the method according to any implementation of the first aspect.

A fourth aspect of the present disclosure provides a computer-readable storage medium. The computer-readable storage medium stores a computer program, and when the computer program is run on a computer, the computer is enabled to perform the method according to any one of the implementations of the first aspect.

A fifth aspect of the present disclosure provides a computer program product. When the computer program product runs on a computer, the computer is enabled to perform the method according to any one of the implementations of the first aspect.

A sixth aspect of the present disclosure provides a chip, including one or more processors. Some or all of the processors are configured to read and execute a computer program stored in a memory, to perform the method according to any possible implementation of any one of the foregoing aspects.

Optionally, the chip includes the memory, and the processor is connected to the memory through a circuit or a wire. Optionally, the chip further includes a communication interface, and the processor is connected to the communication interface. The communication interface is configured to receive data and/or information that needs to be processed. The processor obtains the data and/or information from the communication interface, processes the data and/or information, and outputs a processing result through the communication interface. The communication interface may be an input/output interface. The method according to the present disclosure may be implemented by one chip, or may be cooperatively implemented by a plurality of chips.

DESCRIPTION OF EMBODIMENTS

Figure 1:
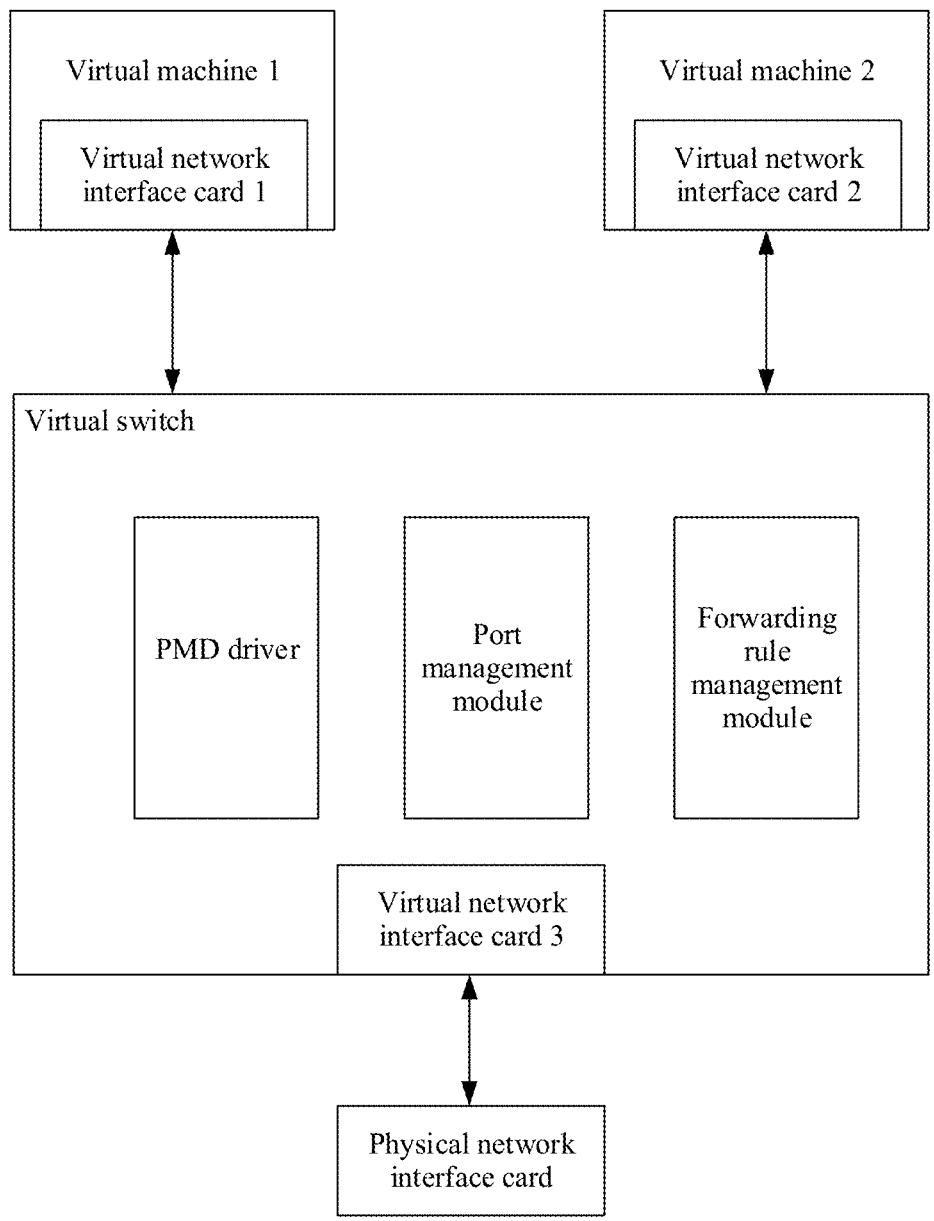
FIG. 1 is a schematic diagram of an architecture of an application scenario according to an embodiment of the present disclosure.

The following describes embodiments of the present disclosure with reference to accompanying drawings. It is clear that the described embodiments are merely some but not all of embodiments of the present disclosure. A person of ordinary skill in the art may learn that technical solutions provided in embodiments of the present disclosure are also applicable to a similar technical problem as a technology develops and a new scenario emerges.

In the specification, claims, and accompanying drawings of the present disclosure, terms "first", "second", and so on are intended to distinguish between similar objects but do not necessarily indicate a specific order or sequence. It should be understood that data termed in such a way is interchangeable in proper circumstances so that embodiments of the present disclosure described herein can be implemented in an order different from the order illustrated or described herein. In addition, terms "include", "have" and any other variants mean to cover non-exclusive inclusion, for example, a process, method, system, product, or device that includes a list of steps or modules is not necessarily limited to those steps or modules, but may include other steps or modules not expressly listed or inherent to such a process, method, product, or device. Names or numbers of steps in the present disclosure does not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved.

On a data plane of a cloud network, an OVS is usually used to forward a data packet in a virtual network. The OVS supports a standard management interface and protocol, as well as data packet distribution across a plurality of physical servers. A powerful OpenFlow flow table capability of the OVS can resolve service function problems at all layers. However, in the cloud computing field, a cluster scale of virtual network nodes is expanding, resulting in an increasingly higher requirement for network performance. In an OVS solution, a hardware network interface card driver works in a kernel mode and relies on a software interrupt to process a packet receiving event. This severely limits forwarding performance.

To resolve a bottleneck problem of network interface card packet receiving performance, a DPDK technology emerges. A DPDK is an open-source development tool set for rapid packet processing, and implements a complete set of user-space real-time running environment based on a Linux operating system but different from the Linux operating system. Unlike the Linux operating system that is designed for generality, the DPDK focuses on high-performance processing of a data packet in a network application. Specifically, an application in the DPDK runs in user space, and sends/receives a data packet by using a data plane library provided by the DPDK, thereby bypassing a processing process of the data packet by using a Linux kernel protocol stack, and implementing high-speed forwarding of the data packet. High performance in a software-based virtualization environment can be achieved based on the OVS and DPDK-based high-speed data packet throughput advantages. High-performance network interface card driver, huge page memory, and lock-free structure design in the DPDK can greatly improve the forwarding performance of the OVS.

In the virtual network, a virtual network interface card (vNIC) is a core for forwarding a data packet. Specifically, the virtual network interface card is a piece of driver software implemented by using a network underlying programming technology. After the virtual network interface card is installed, a non-real network interface card is added to a host and can be configured like another network interface card. A service program may open the virtual network interface card at an application layer. If application software (for example, a web browser) sends data to the virtual network interface card, the service program may read the data. If the service program writes appropriate data to the virtual network interface card, the application software may also receive the data written by the service program. Generally, the virtual network interface card has a corresponding virtual network interface card queue, and the virtual network interface card queue includes a to-be-forwarded data packet.

In an OVS+DPDK solution, a PMD thread is responsible for processing data packet sending and receiving on a DPDK data path. In a working process of the PMD thread, the PMD thread periodically polls a virtual network interface card queue. Once a data packet in the virtual network interface card queue is obtained, the data packet is parsed and forwarded.

Currently, the PMD thread is bound to the virtual network interface card queue in advance. Each virtual network interface card queue is bound to a unique corresponding PMD thread, and one PMD thread may be bound to one or more virtual network interface card queues. However, in an actual forwarding scenario, load of the virtual network interface card queue changes continuously. Each PMD (or PMD threads) is bound to a different virtual network interface card queue. As the load of the virtual network interface card queue changes continuously, a fixed binding manner causes load imbalance between PMD threads, and consequently, computing resources are not fully utilized.

In view of this, embodiments of the present disclosure provide a load balancing method for multi-thread forwarding. A thread with high load and a thread with low load are selected from a plurality of threads that process virtual network interface card queues, and a virtual network interface card queue processed by the thread with high load is switched to the thread with low load. In the way, load balancing between the threads is implemented, full utilization of computing resources is ensured, and computing resource utilization is improved.

FIG. 1 is a schematic diagram of an architecture of an application scenario according to an embodiment of the present disclosure. The architecture of the application scenario includes software modules and a hardware module. The software module includes a virtual machine (VM) 1, a virtual machine 2, and a virtual switch (vSwitch). The hardware module includes a physical network interface card. The virtual machine 1 includes a virtual network interface card 1, the virtual machine 2 includes a virtual network interface card 2, and the virtual switch includes a PMD driver, a port management module, a forwarding rule management module, and a virtual network interface card 3.

A virtual machine is a computer that can be simulated on a physical computer by using virtual machine software. The virtual machine can work like a real computer. An operating system and an application may be installed on the virtual machine, and the virtual machine may further access network resources. For an application running in a virtual machine, the virtual machine works like a real computer. For example, the virtual machine 1 and the virtual machine 2 in FIG. 1 respectively bear different services.

A virtual switch is used to forward and control data between virtual machines. For example, the virtual switch in FIG. 1 is responsible for data exchange between the virtual machine 1 and the virtual machine 2. The virtual switch can receive a data packet from the virtual machine 1, and forward the data packet to the virtual machine 2, so as to implement data exchange between the virtual machine 1 and the virtual machine 2.

In addition, the PMD driver in the virtual switch is used to control a behavior of sending/receiving a data packet of a network interface card in a user mode, so as to reduce consumption of trap-in or trap-out of a kernel and improve performance. The port management module adds and deletes a port. The forwarding rule management module adds and deletes a routing rule, and determines a direction of a data packet according to the routing rule. A function of the physical network interface card is to receive and send data in a form of a bit stream.

A product implementation form of the load balancing method for multi-thread forwarding provided in embodiments of the present disclosure may be program code deployed on a terminal, in particular, deployed on a server in a cloud network. The program code provided in embodiments of the present disclosure is run on a data plane of the cloud network, that is, a data packet forwarding process between virtual machines. For example, the program code provided in embodiments of the present disclosure is run in the virtual switch in FIG. 1, and can be used to schedule a PMD thread on the PMD driver.

For example, the terminal in embodiments of the present disclosure may be, for example, a server, a personal computer (PC), a notebook computer, a mobile phone, a tablet computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in a smart city, or a wireless terminal in a smart home. The terminal may be a device that runs an Android® system, an iOS® system, a Windows® system, or another system.

Figure 2:
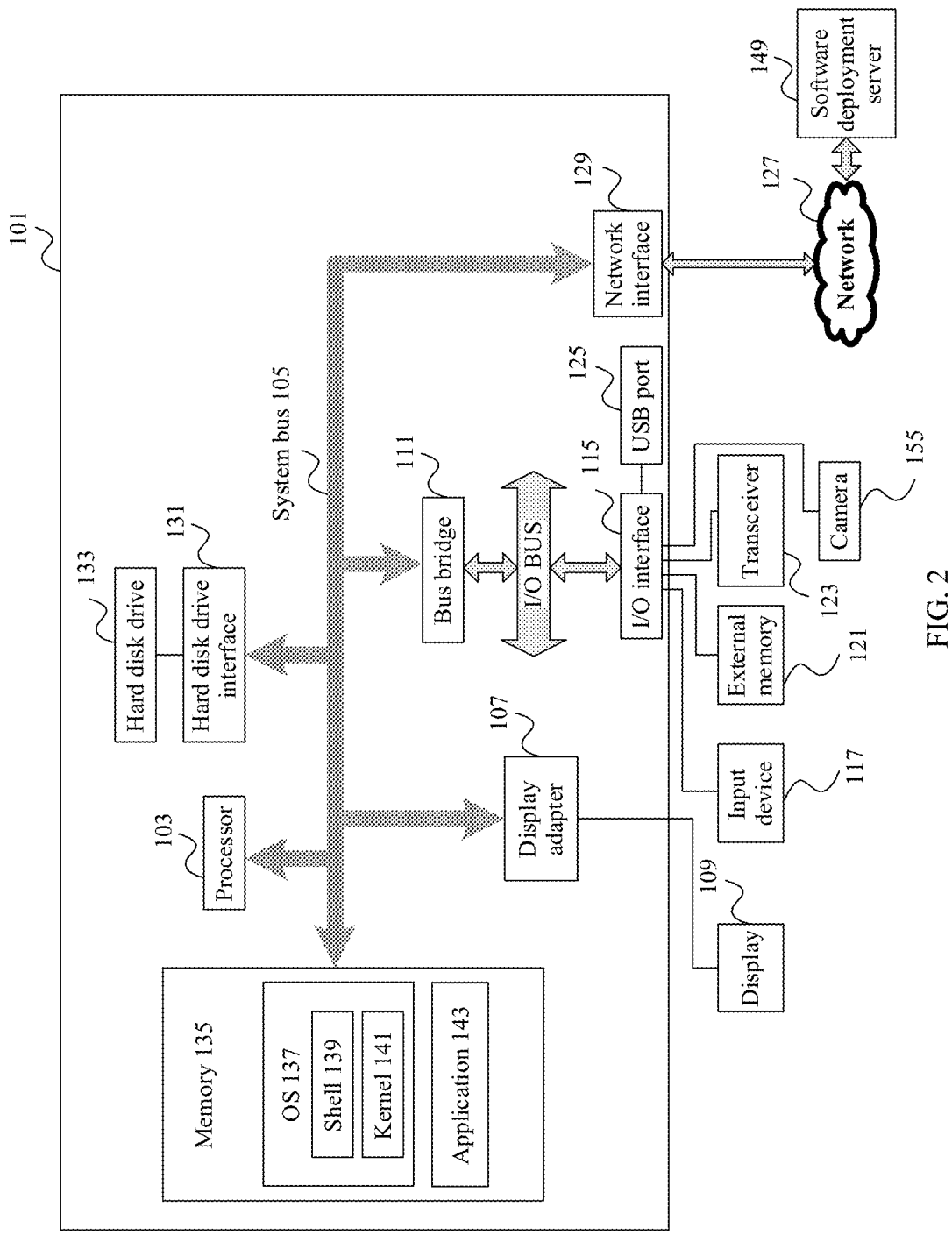
FIG. 2 is a schematic diagram of a structure of a terminal according to an embodiment of the present disclosure.

FIG. 2 is a schematic diagram of a structure of a terminal 101 according to an embodiment of the present disclosure. As shown in FIG. 2, the terminal 101 includes a processor 103, and the processor 103 is coupled to a system bus 105. The processor 103 may be one or more processors, and each processor may include one or more processor cores. A display adapter (video adapter) 107 is further included, the display adapter may drive a display 109, and the display 109 is coupled to the system bus 105. The system bus 105 is coupled to an input/output (I/O) bus through a bus bridge 111. An I/O interface 115 is coupled to the I/O bus. The I/O interface 115 communicates with a plurality of I/O devices, such as an input device 117 (for example, a touchscreen), an external memory 121 (for example, a hard disk, a floppy disk, a compact disc, a Universal Serial Bus (USB) flash drive, or a multimedia interface), a transceiver 123 (which may send and/or receive a radio communication signal), a camera 155 (which may capture static and dynamic digital video images), and an external USB port 125. Optionally, an interface connected to the I/O interface 115 may be a USB port.

The processor 103 may be any conventional processor, including a reduced instruction set computing (RISC) processor, a complex instruction set computing (CISC) processor, or a combination thereof. Optionally, the processor may be a dedicated apparatus such as an application-specific integrated circuit (ASIC).

The terminal 101 may communicate with a software deployment server 149 through a network interface 129. For example, the network interface 129 is a hardware network interface, for example, a network interface card. A network 127 may be an external network, for example, the internet, or may be an internal network, for example, the Ethernet or a virtual private network (VPN). Optionally, the network 127 may alternatively be a wireless network, for example, a Wi-Fi® network or a cellular network.

A hard disk drive interface 131 is coupled to the system bus 105. A hardware disk driver interface is connected to a hard disk drive 133. A memory 135 is coupled to the system bus 105. Data running in the memory 135 may include an operating system 137, an application 143, and a scheduling table of the terminal 101.

The operating system includes a shell 139 and a kernel 141. The shell 139 is an interface between a user and the kernel of the operating system. The shell is an outermost layer of the operating system. The shell manages interaction between the user and the operating system: After an input from the user, the shell interprets the input from the user to the operating system, and processes various output results of the operating system.

The kernel 141 includes parts of the operating system that are used for managing a memory, a file, a peripheral device, and a system resource. The kernel 141 directly interacts with hardware. The kernel of the operating system usually runs processes, provides inter-process communication, and provides central processing unit (CPU) time slice management, interruption, memory management, I/O management, and the like.

For example, when the terminal 101 is a smartphone, the application 143 includes an instant messaging related program. In an embodiment, when the application 143 needs to be executed, the terminal 101 may download the application 143 from the software deployment server 149.

Figure 3:
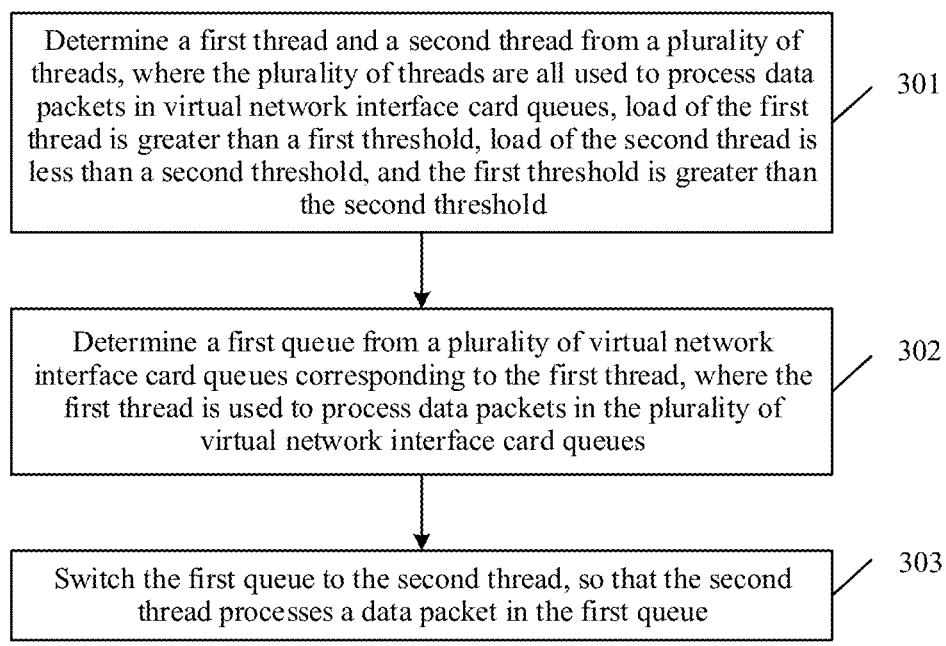
FIG. 3 is a schematic flowchart of a load balancing method for multi-thread forwarding according to an embodiment of the present disclosure.

For ease of description, the following describes the load balancing method for multi-thread forwarding provided in embodiments of the present disclosure by using an example in which the terminal is the server on the cloud network. FIG. 3 is a schematic flowchart of the load balancing method for multi-thread forwarding according to an embodiment of the present disclosure. As shown in FIG. 3, the load balancing method for multi-thread forwarding includes the following steps 301 to 303.

Step 301: The server determines a first thread and a second thread from a plurality of threads, where the plurality of threads is all used to process data packets in virtual network interface card queues, load of the first thread is greater than a first threshold, load of the second thread is less than a second threshold, and the first threshold is greater than the second threshold.

In this embodiment, in a public cloud scenario, one or more virtual machines may be created in the server used as a computing node. Each virtual machine includes one or more virtual network interface cards. Each virtual network interface card may have one or more virtual network interface card queues. The virtual network interface card queue includes a to-be-forwarded data packet. Generally, hundreds or even thousands of virtual network interface card queues may exist on the server used as the computing node.

To process the data packets in the virtual network interface card queues, the plurality of threads may be created in the server. The plurality of threads is all used to process the data packets in the virtual network interface card queues, to be specific, parse and forward the data packets in the virtual network interface card queues. Each thread created in the server may correspond to one or more virtual network interface card queues, and virtual network interface card queues corresponding to the threads do not overlap each other. In other words, each virtual network interface card queue can correspond to only one thread at a time.

For example, the thread created by the server may be a PMD thread, and the PMD thread may be responsible for data packet sending and receiving on a DPDK data path.

Generally, different virtual network interface card queues correspond to different services in the virtual machine, and data packets in different virtual network interface card queues are usually generated by different services. However, data packets generated by different services in different time periods are different, and data packets generated by the services change with time. Therefore, in an actual service scenario, quantities of data packets in different virtual network interface card queues are different. In addition, in most cases, the services in the virtual machine do not always need to exchange data. Therefore, most virtual network interface card queues have no data packet, and only a few virtual network interface card queues have to-be-processed data packets.

In this way, as time goes by, the quantities of data packets in the virtual network interface card queues change, so that load of threads responsible for processing the virtual network interface card queues also continuously change. In some cases, because the quantities of data packets in the virtual network interface card queues change, a phenomenon of load imbalance between threads may occur, to be specific, load of a part of threads is excessively high, and load of a part of threads is excessively low.

Therefore, two thresholds are set in this embodiment, that is, the first threshold and the second threshold. When load of a thread is greater than the first threshold, it may be considered that the load of the thread is excessively high. When load of a thread is less than the second threshold, it may be considered that the load of the thread is excessively low. Based on the preset first threshold and second threshold, the server may determine, from the plurality of threads responsible for processing the virtual network interface card queues, the first thread whose load is greater than the first threshold and the second thread whose load is less than the second threshold.

Optionally, the load of the thread may include processor resource utilization corresponding to the thread.

In some scenarios, each thread is run by a single CPU, and resources of all CPUs are the same. Therefore, in this scenario, the server may determine load of each thread based on resource utilization of each CPU. The CPU resource utilization refers to a ratio of a quantity of valid CPU cycles in a specific time period to a total quantity of CPU cycles in the time period. The quantity of valid CPU cycles refers to a quantity of CPU cycles consumed by a thread to process a data packet in a virtual network interface card queue. When the load of each thread is determined based on the resource utilization of each CPU, a value range of the first threshold may be, for example, 80% to 90%, and a value range of the second threshold may be, for example, 50% to 60%. For example, a value of the first threshold may be 90%, and a value of the second threshold may be 60%. Alternatively, the first threshold and the second threshold may be other values. This is not specifically limited in this embodiment.

The CPU cycle is also referred to as a machine cycle. In a computer, to facilitate management, an execution process of an instruction is usually divided into several phases (such as instruction fetching, decoding, and execution). Each phase completes a basic operation. A time period required to complete a basic operation is called the machine cycle. Generally, one machine cycle includes several clock cycles.

Step 302: The server determines a first queue from a plurality of virtual network interface card queues corresponding to the first thread, where the first thread is used to process data packets in the plurality of virtual network interface card queues.

After determining the first thread whose load is greater than the first threshold, the server may determine, from the plurality of virtual network interface card queues corresponding to the first thread, the first queue that needs to be switched to the second thread. The first queue may include one or more virtual network interface card queues.

Optionally, to avoid a case in which the load of the first thread decreases to less than the second threshold or the load of the second thread increases to greater than the first threshold after the first queue is switched to the second thread, the server may determine the first queue based on current load of the first thread and current load of the second thread.

For example, the server may first determine a first load amount based on the load of the first thread and the second threshold. The first load amount is a maximum load amount that can be transferred by the first thread to the second thread. After the first thread transfers the first queue to the second thread, the load of the first thread cannot decrease to less than the second threshold. Therefore, the server may obtain the first load amount by subtracting the second threshold from the load of the first thread. For example, assuming that the load of the first thread before queue transfer is 95%, and the second threshold is 60%, the first load amount is 95%-60%-35%.

Then, the server determines a second load amount based on the load of the second thread and the first threshold. The second load amount is a maximum load amount that can be received by the second thread and transferred by the first thread. After the second thread is responsible for the first queue transferred by the first thread, the load of the second thread cannot increase to greater than the first threshold. Therefore, the server may obtain the second load amount by subtracting the load of the second thread from the first threshold. For example, assuming that the load of the second thread before queue transfer is 65%, and the first threshold is 90%, the second load amount is 90%–65%=25%.

Finally, the first queue is determined based on the first load amount and the second load amount. Both the first load amount and the second load amount are greater than or equal to a load amount corresponding to the first queue. Specifically, the server may determine a load amount corresponding to each of the plurality of virtual network interface card queues corresponding to the first thread, and then determine the final first queue based on the load amount corresponding to each virtual network interface card queue, to ensure that the load amount corresponding to the first queue is less than the first load amount and the second load amount. The load amount corresponding to the virtual network interface card queue may be processor resources occupied by the first thread when processing the virtual network interface card queue, for example, the foregoing CPU resource utilization.

For example, assuming that the first load amount is 35% and the second load amount is 25%, the load amount corresponding to the first queue determined by the server is less than 25%. Specifically, the server may determine that one or more virtual network interface card queues corresponding to the first thread are the first queue, but it should be ensured that a sum of load amounts corresponding to the one or more virtual network interface card queues corresponding to the first queue determined by the server is less than both the first load amount and the second load amount.

Step 303: The server switches the first queue to the second thread, so that the second thread processes a data packet in the first queue.

After the server determines the first queue that is in the first thread and that needs to be switched to the second thread, the server may switch the first queue to the second thread, and the second thread is responsible for processing the data packet in the first queue. After the first queue is switched to the second thread, the first thread is no longer responsible for processing the data packet in the first queue.

In this embodiment, a thread with high load and a thread with low load are selected from the plurality of threads that process the virtual network interface card queues, and a virtual network interface card queue processed by the thread with high load is switched to the thread with low load. In the way, load balancing between the threads is implemented, full utilization of computing resources is ensured, and computing resource utilization is improved.

It may be understood that, in an actual service scenario, most virtual network interface card queues do not have data packets. In this scenario, if the thread periodically polls the virtual network interface card queues, empty queues are frequently polled, and CPU resources are wasted.

Based on this, in this embodiment, two packet receiving modes are provided for the virtual network interface card queues: a polling packet receiving mode and an interrupt packet receiving mode. When a virtual network interface card queue is in the polling packet receiving mode, a thread responsible for the virtual network interface card queue periodically polls the virtual network interface card queue, so as to receive and forward a data packet in the virtual network interface card queue. When a virtual network interface card queue is in the interrupt packet receiving mode, a thread responsible for the virtual network interface card queue no longer polls the virtual network interface card queue, but interrupts a normal behavior when obtaining an interrupt signal from the virtual network interface card queue, and triggers processing of a data packet in the virtual network interface card queue.

Generally, an advantage of processing the virtual network interface card queue based on the interrupt packet receiving mode is timely response. If a data volume in the virtual network interface card queue is small, few CPU cycles are occupied. However, when the data volume in the virtual network interface card queue is large, excessive interrupts are generated, and each interrupt consumes a large quantity of CPU cycles. As a result, efficiency is not as high as that of the polling packet receiving mode.

On the contrary, the polling packet receiving mode is more applicable to a scenario where a large amount of data needs to be processed. This is because few CPU cycles are consumed each time the thread polls the virtual network interface card queue. A disadvantage of the polling packet receiving mode is that when there is little or no data in the virtual network interface card queue, the thread need to continuously poll the virtual network interface card queue, and therefore CPU cycles need to be continuously occupied.

In other words, when a data packet is continuously generated in the virtual network interface card queue, compared with processing the data packet in the virtual network interface card queue after obtaining the interrupt signal from the virtual network interface card queue, the thread periodically polls the virtual network interface card queue to process the data packet in the virtual network interface card queue with higher efficiency.

Therefore, in this embodiment, the server may control, based on an actual data change situation in the virtual network interface card queue, the virtual network interface card queue to switch between the interrupt packet receiving mode and the polling packet receiving mode.

In a possible embodiment, if a quantity of times that the first thread in the server continuously polls a second queue marked as the polling packet receiving mode is greater than a third threshold, and no data packet is received during a period in which the first thread continuously polls the second queue, the second queue is marked as the interrupt packet receiving mode. The second queue is a queue in the plurality of virtual network interface card queues corresponding to the first thread. A value of the third threshold may be adjusted based on an actual requirement. When the computing resources are insufficient, the value of the third threshold may be adjusted to a small value. When a response requirement is high, the value of the third threshold may be adjusted to a large value. For example, the value of the third threshold may be 1000.

Simply speaking, for the second queue marked as the polling packet receiving mode, if no data packet is received during the period in which the first thread continuously polls the second queue, and the first thread has polled the second queue for a specific quantity of times, it may be considered that there is a high probability that the second queue does not generate a data packet in future. Therefore, the server may change a mode of the second queue that is currently in the polling packet receiving mode to the interrupt packet receiving mode, so that the first thread does not periodically poll the second queue, thereby reducing resource consumption of polling an empty queue, and saving processor resources.

In another possible embodiment, if the first thread in the server obtains an interrupt signal from a third queue marked as the interrupt packet receiving mode, the third queue is marked as the polling packet receiving mode. In addition, after the first thread obtains the interrupt signal from the third queue, the first thread triggers processing of a data packet in the third queue. The third queue is a queue in the plurality of virtual network interface card queues corresponding to the first thread. The interrupt packet receiving mode marked by the third queue indicates the first thread to trigger processing of the data packet in the third queue after obtaining the interrupt signal from the third queue. The polling packet receiving mode subsequently marked by the third queue indicates the first thread to process the data packet in the third queue in the polling manner.

Simply speaking, for the third queue marked as the interrupt packet receiving mode, if the third thread obtains the interrupt signal from the third queue, it may be considered that there is a high probability that the third queue continuously generates a data packet in future. Therefore, the server may change a mode of the third queue that is currently in the interrupt packet receiving mode to the polling packet receiving mode, so that the first thread can periodically poll the third queue, thereby improving processing efficiency of the first thread.

Optionally, when a virtual network interface card queue corresponding to a thread may be marked as the polling packet receiving mode or the interrupt packet receiving mode, when the server determines a virtual network interface card queue that is in a thread and that needs to be switched to another thread, the virtual network interface card queue may be determined from virtual network interface card queues marked as the polling packet receiving mode.

For example, when the server needs to determine a virtual network interface card queue that is in the first thread and that is to be switched to the second thread, the server may determine, from the plurality of virtual network interface card queues corresponding to the first thread, one or more virtual network interface card queues marked as the polling packet receiving mode. Then, the server determines, from the one or more virtual network interface card queues marked as the polling packet receiving mode, the first queue that needs to be switched to the second thread.

Because the virtual network interface card queue marked as the interrupt packet receiving mode is a queue without a data packet, the thread does not need to consume additional computing resources to process the virtual network interface card queue marked as the interrupt packet receiving mode. That is, the virtual network interface card queue marked as the interrupt packet receiving mode corresponds to low or even no load. In this case, the server may select, from the virtual network interface card queues marked as the polling packet receiving mode, a queue that needs to be switched to the second thread, to ensure that load of the first thread can be smoothly transferred to the second thread.

Specifically, the server may switch the first queue from the first thread to the second thread based on the following steps.

First, the server may mark the first queue as a scheduling mode. The scheduling mode indicates that the first queue is a queue of a to-be-switched thread. When the first queue is marked as the scheduling mode, the server no longer marks the first queue as the interrupt packet receiving mode, so as to ensure that the first queue can be smoothly switched to the second thread subsequently. In addition, when the first queue is marked as the scheduling mode, the first thread does not continue to process the data packet in the first queue, so as to avoid that the second thread and the first thread may process the data packet in the first queue in a switching process.

Then, the server switches the first queue in the scheduling mode from the first thread to the second thread, and the second thread is responsible for processing the data packet in the first queue. After the first queue is switched to the second thread, the first thread is no longer responsible for processing the data packet in the first queue.

Finally, the server marks the first queue that is switched to the second thread as the polling packet receiving mode, so as to indicate the second thread to process the data packet in the first queue in the polling manner.

In this embodiment, after the virtual network interface card queue of a to-be-switched thread is marked as the scheduling mode, thread switching is performed on the virtual network interface card queue marked as the scheduling mode, so that the virtual network interface card queue can be prevented from being simultaneously processed by a plurality of threads in a thread switching process, and a smooth thread switching process is ensured.

It may be understood that, in the public cloud scenario, service strength of a user is unstable. A news service model is used as an example. A service traffic volume is affected by a hot event. When explosive news occurs, access traffic of the news service model increases sharply. As a result, forwarding pressure on a data plane increases sharply and exceeds a load limit of the PMD thread. In this case, service functions cannot be ensured by scheduling the PMD thread. In addition, when popularity of the hot event fades, the access traffic of the news business model returns to normal. In addition, service traffic of the news service model in some special time periods is usually different from service traffic in normal time periods. For example, for the news service model, usually access traffic on a weekend is greater than access traffic on a weekday.

To cope with the foregoing scenario in which service traffic continuously changes, in this embodiment of the present disclosure, a quantity of threads used to process virtual network interface card queues is adjusted to adapt to a change in service traffic.

For example, the server may obtain load of a plurality of threads in a first time period, and the plurality of threads are all used to process data packets in virtual network interface card queues. The server may separately obtain a load track of each thread in the plurality of threads in the first time period, so as to determine a load change of each thread in the first time period.

Then, the server predicts load of the plurality of threads in a second time period based on the load of the plurality of threads in the first time period. The second time period is after the first time period. Simply speaking, the first time period may be a past time period, and the second time period may be a future time period. The server predicts load of the plurality of threads in a future period of time based on load of the plurality of threads in a past period of time. A time length of the first time period and a time length of the second time period may be the same or different. Time lengths of the first time period and the second time period may be determined based on an actual requirement, and the time lengths of the first time period and the second time period are not limited in this embodiment. For example, the server predicts load of the plurality of threads in a future week based on load of the plurality of threads in a past week. Alternatively, the server predicts load of the plurality of threads in a future hour based on load of the plurality of threads in past several hours.

Specifically, the server may predict the load of the plurality of threads in the second time period according to an existing load prediction algorithm or a traffic prediction algorithm. For example, the server may predict the load of the plurality of threads in the second time period according to a long short-term memory (LSTM) network algorithm.

If the load of the plurality of threads in the second time period is greater than a fourth threshold, a new thread is created. The new thread is used to process the data packets in the virtual network interface card queues. The load of the plurality of threads in the second time period may be average load of the plurality of threads in the second time period, or may be total load of the plurality of threads in the second time period.

Specifically, when the load of the plurality of threads in the second time period is the average load of the plurality of threads in the second time period, the fourth threshold may be preset. When the load of the plurality of threads in the second time period is the total load of the plurality of threads in the second time period, the fourth threshold may be determined based on the quantity of the plurality of threads. For example, when the load of the thread is represented by CPU utilization, when the load of the plurality of threads in the second time period is the average load of the plurality of threads in the second time period, a value range of the fourth threshold may be 80% to 95%, for example, a value of the fourth threshold is 90%. Similarly, when the load of the plurality of threads in the second time period is the total load of the plurality of threads in the second time period, if the quantity of the plurality of threads is 10, the value range of the fourth threshold may be 800% to 950%, for example, the value of the fourth threshold is 900%.

When it is predicted that load of the plurality of threads is high in a future period of time, the server may create a new thread, so as to timely cope with high service traffic in the future period of time, ensure that the burst service traffic can be processed in a timely and effective manner, and ensure service reliability.

If the load of the plurality of threads in the second time period is less than a fifth threshold, a part of threads are deleted from the plurality of threads. For example, when the load of the thread is represented by the CPU utilization, when the load of the plurality of threads in the second time period is the average load of the plurality of threads in the second time period, the value range of the fourth threshold may be 50% to 60%, for example, the value of the fourth threshold is 60%. Similarly, when the load of the plurality of threads in the second time period is the total load of the plurality of threads in the second time period, if the quantity of the plurality of threads is 10, the value range of the fourth threshold may be 500% to 600%, for example, the value of the fourth threshold is 600%.

Specifically, that the server deletes a part of threads from the plurality of threads includes: The server determines a to-be-deleted thread and a to-be-reserved thread from the plurality of threads. For example, the server may determine one or more threads with lowest load in the plurality of threads as the to-be-deleted thread, and a thread other than the to-be-deleted thread in the plurality of threads is the to-be-reserved thread. Then, the server switches a virtual network interface card queue corresponding to the to-be-deleted thread to the to-be-reserved thread, so that the to-be-deleted thread is no longer responsible for processing a data packet in the virtual network interface card queue. Finally, the server deletes the to-be-deleted thread.

In this way, when it is predicted that load of the plurality of threads is low in the future period of time, the server may share the virtual network interface card queue on the thread with lowest load to another thread, and delete the thread, to release processor resources corresponding to the thread and save the processor resources.

For ease of understanding, the following describes a load balancing method for multi-thread forwarding provided in embodiments of the present disclosure with reference to specific examples.

Figure 4:
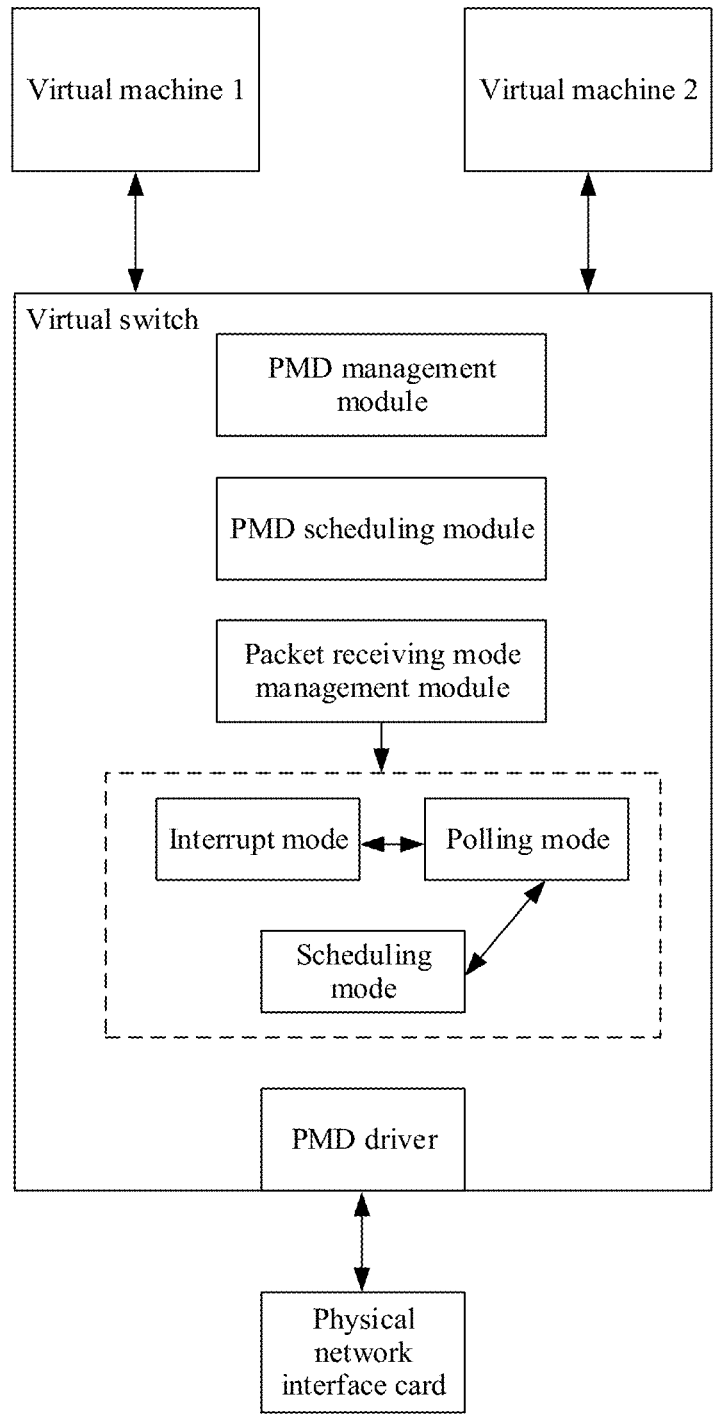
FIG. 4 is a schematic diagram of an architecture of a server according to an embodiment of the present disclosure.

Specifically, refer to FIG. 4. FIG. 4 is a schematic diagram of an architecture of a server according to an embodiment of the present disclosure. As shown in FIG. 4, the server includes a virtual machine 1, a virtual machine 2, a virtual switch, and a physical network interface card. The virtual switch includes a PMD management module, a PMD scheduling module, a packet receiving mode management module, and a PMD driver. In addition, in the server, a PMD thread is used to process a data packet in a virtual network interface card queue, so as to implement data packet sending and receiving.

The PMD scheduling module implements load balancing between PMD threads by collecting statistics on CPU resource utilization of each PMD thread and by using an overload (overload) threshold (that is, the foregoing first threshold) and an underload (underload) threshold (that is, the foregoing second threshold). After the overload threshold and underload threshold are set, when CPU resource utilization of a PMD thread is greater than the overload threshold, some virtual network interface card queues of the PMD thread are scheduled to a PMD whose CPU resource utilization is less than the underload threshold. In addition, in a scheduling process, the PMD scheduling module needs to ensure that after scheduling is completed, a PMD whose original CPU resource utilization is greater than the overload threshold cannot be changed to a PMD whose CPU resource utilization is less than the underload threshold. Similarly, a PMD whose original CPU resource utilization is less than the underload threshold cannot be changed to a PMD whose CPU resource utilization is greater than the overload threshold.

A packet receiving and sending management module manages intelligent switching of the virtual network interface card queue among three modes: a scheduling mode, an interrupt packet receiving mode, and a polling packet receiving mode. Specifically, the packet receiving and sending management module marks a virtual network interface card queue that continuously has no data packet as the interrupt packet receiving mode, so that polling of the PMD thread is interrupted, and CPU resources consumed by polling an empty queue are reduced. When load of a plurality of PMD threads is unbalanced, the packet receiving and sending management module switches some virtual network interface card queues on a PMD with high load from the polling packet receiving mode to the scheduling mode, switches a virtual network interface card queue in the scheduling mode to a PMD with low load, and switches a packet receiving mode of the virtual network interface card queue from the scheduling mode to the polling packet receiving mode, so as to implement load balancing between threads.

The PMD management module predicts CPU resource utilization of each PMD thread by using a machine learning algorithm, for example, an LSTM algorithm, and periodically pre-adjusts a quantity of PMD threads based on a prediction result.

Figure 5:
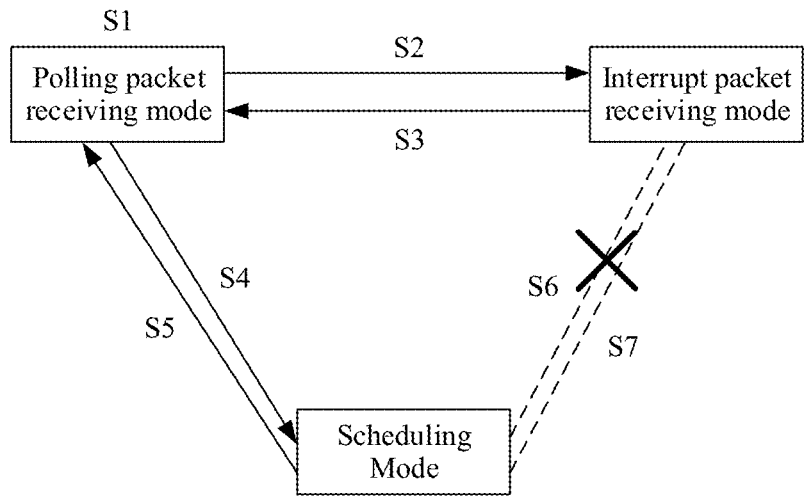
FIG. 5 is a schematic diagram of switching among packet receiving modes of a virtual network interface card queue according to an embodiment of the present disclosure.

For example, refer to FIG. 5. FIG. 5 is a schematic diagram of switching among packet receiving modes of a virtual network interface card queue according to an embodiment of the present disclosure. As shown in FIG. 5, a switching rule among the packet receiving modes of the virtual network interface card queue is shown in S1 to S7.

S1: A default packet receiving mode of each virtual network interface card queue is a polling packet receiving mode.

S2: The polling packet receiving mode→an interrupt packet receiving mode: When a PMD thread continuously polls a virtual network interface card queue for k times and no data packet is received, the virtual network interface card queue is switched from the polling packet receiving mode to the interrupt packet receiving mode. After that, the PMD thread no longer polls the virtual network interface card queue, but senses a packet receiving event based on an interrupt signal.

S3: The interrupt packet receiving mode→the polling packet receiving mode: When there is a data packet in the virtual network interface card queue switched to the interrupt packet receiving mode, the virtual network interface card queue is woken up from interrupt, and switched from the interrupt packet receiving mode to the polling packet receiving mode.

S4: The polling packet receiving mode→a scheduling mode: When load is unbalanced between a plurality of PMD threads, some virtual network interface card queues on a PMD with high load are switched from the polling packet receiving mode to the scheduling mode by using a scheduling rule of a PMD scheduling module. In this way, the virtual network interface card queue in the scheduling mode is switched to a PMD with low load, so as to implement load balancing between threads.

S5: The scheduling mode→the polling packet receiving mode: After the virtual network interface card queue in the scheduling mode is switched to a new PMD thread, the virtual network interface card queue is switched from the scheduling mode to the polling packet receiving mode, and the new PMD thread performs normal polling packet receiving on the virtual network interface card queue.

S6: The interrupt packet receiving mode→the scheduling mode: not allowed. A virtual network interface card queue that is added to the interrupt packet receiving mode do not affect packet sending and receiving performance and do not participate in scheduling.

S7: The scheduling mode→the interrupt packet receiving mode: not allowed. A virtual network interface card queue newly added to the PMD thread sends/receives data packets in the polling packet receiving mode.

By controlling proper switching of queues in the polling packet receiving mode, the interrupt packet receiving mode, and the scheduling mode, a load imbalance problem in a scenario of a plurality of PMD threads and a plurality of queues can be solved at the same time, and a problem of CPU resource waste caused by polling an empty queue can be solved.

Figure 6:
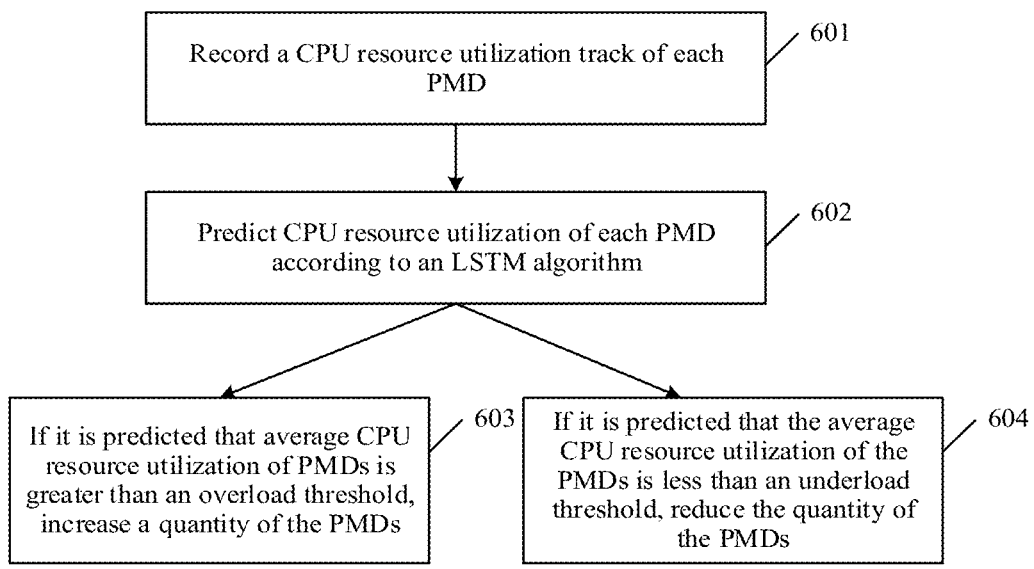
FIG. 6 is a schematic flowchart of adjusting a quantity of PMD threads according to an embodiment of the present disclosure.

FIG. 6 is a schematic flowchart of adjusting a quantity of PMD threads according to an embodiment of the present disclosure. As shown in FIG. 6, a process of adjusting the quantity of the PMD threads includes the following steps 601 to 603.

Step 601: A PMD management module records a CPU resource utilization track of each PMD thread.

Specifically, CPU resource utilization refers to a ratio of a quantity of valid CPU cycles in a specific time period to a total quantity of CPU cycles in the time period. The quantity of valid CPU cycles refers to a quantity of CPU cycles consumed by a PMD thread to process a data packet in a virtual network interface card queue. The PMD management module observes CPU resource utilization of each PMD thread in real time, and may record the CPU resource utilization track of each PMD thread in a period of time.

Step 602: Predict the CPU resource utilization of each PMD thread according to an LSTM algorithm.

Simply speaking, after recording load tracks of the PMD threads, the PMD management module may predict, according to the LSTM algorithm and based on historical load tracks, load of the PMD threads in a future period of time.

Step 603: If it is predicted that average CPU resource utilization of the PMD threads is greater than an overload threshold, increase the quantity of the PMD threads.

For example, when predicting that access traffic increases due to a hot event, or periodically predicting that access traffic on a weekend is greater than access traffic on a workday, the PMD management module increases the quantity of the PMD threads in advance to ensure service reliability.

Step 604: If it is predicted that the average CPU resource utilization of the PMD threads is less than an underload threshold, reduce the quantity of the PMD threads.

For example, when identifying that popularity of the hot event is about to fade and the access traffic is reduced, or identifying that the access traffic on a workday is less than the access traffic on a weekend, the PMD management module reduces the quantity of the PMD threads in advance, so as to ensure service reliability and reduce CPU consumption.

CPU resource utilization of the PMD threads in a historical time period is used to predict load of the PMD threads in a future period of time. In addition, before traffic is predicted to increase, the quantity of the PMD threads is increased in advance, to improve a service processing capability and ensure service stability. In addition, when traffic is predicted to decrease, the quantity of the PMD threads is reduced to avoid computing resources waste.

Based on embodiments corresponding to FIG. 1 to FIG. 6, the following further provides related devices configured to implement the foregoing solutions, to better implement the solutions in embodiments of the present disclosure.

Figure 7:
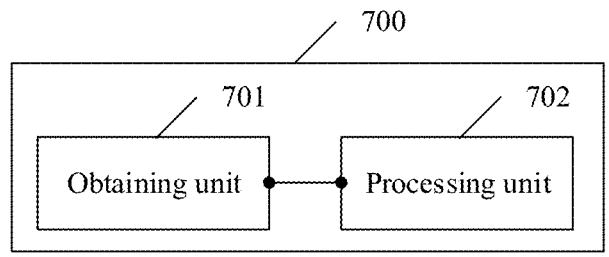
FIG. 7 is a schematic diagram of a structure of a scheduling apparatus according to an embodiment of the present disclosure.

For details, refer to FIG. 7. FIG. 7 is a schematic diagram of a structure of a scheduling apparatus 700 according to an embodiment of the present disclosure. The scheduling apparatus 700 includes an obtaining unit 701 and a processing unit 702. The processing unit 702 is configured to: determine a first thread and a second thread from a plurality of threads, where the plurality of threads are all used to process a data packet in a virtual network interface card queue, load of the first thread is greater than a first threshold, load of the second thread is less than a second threshold, and the first threshold is greater than the second threshold; determine a first queue from a plurality of virtual network interface card queues corresponding to the first thread, where the first thread is used to process data packets in the plurality of virtual network interface card queues; and switch the first queue to the second thread, so that the second thread processes a data packet in the first queue.

In a possible implementation, the processing unit 702 is further configured to: mark the first queue as a scheduling mode, where the scheduling mode indicates that the first queue is a queue of a to-be-switched thread; switch the first queue in the scheduling mode from the first thread to the second thread; and mark the first queue that is switched to the second thread as a polling packet receiving mode, where the polling packet receiving mode indicates the second thread to process the data packet in the first queue in a polling manner.

In a possible implementation, the processing unit 702 is further configured to: determine, from the plurality of virtual network interface card queues corresponding to the first thread, one or more virtual network interface card queues marked as the polling packet receiving mode; and determine the first queue from the one or more virtual network interface card queues.

In a possible implementation, the processing unit 702 is further configured to: determine a first load amount based on the load of the first thread and the second threshold, where the first load amount is a maximum load amount that can be transferred by the first thread; determine a second load amount based on the load of the second thread and the first threshold, where the second load amount is a maximum load amount that can be received by the second thread; and determine the first queue based on the first load amount and the second load amount, where both the first load amount and the second load amount are greater than or equal to a load amount corresponding to the first queue.

In a possible implementation, the processing unit 702 is further configured to: if a quantity of times that the first thread continuously polls the second queue marked as the polling packet receiving mode is greater than a third threshold, and no data packet is received during a period in which the first thread continuously polls the second queue, mark the second queue as an interrupt packet receiving mode. The plurality of virtual network interface card queues includes the second queue, and the interrupt packet receiving mode indicates the first thread to trigger processing of a data packet in the second queue after obtaining an interrupt signal from the second queue.

In a possible implementation, the processing unit 702 is further configured to: if the first thread obtains an interrupt signal from a third queue marked as the interrupt packet receiving mode, mark the third queue as the polling packet receiving mode. The interrupt packet receiving mode indicates the first thread to trigger processing of a data packet in the third queue after obtaining an interrupt signal from the third queue, and the polling packet receiving mode indicates the first thread to process the data packet in the third queue in the polling manner.

In a possible implementation, the obtaining unit 701 is configured to obtain load of the plurality of threads in a first time period. The processing unit 702 is further configured to: predict load of the plurality of threads in a second time period based on the load of the plurality of threads in the first time period, where the second time period is after the first time period; and if the load of the plurality of threads in the second time period is greater than a fourth threshold, create a new thread, where the new thread is used to process the data packet in the virtual network interface card queue; or if the load of the plurality of threads in the second time period is less than a fifth threshold, delete a part of threads from the plurality of threads.

In a possible implementation, the processing unit 702 is further configured to: determine a to-be-deleted thread and a to-be-reserved thread from the plurality of threads; switch a virtual network interface card queue corresponding to the to-be-deleted thread to the to-be-reserved thread; and delete the to-be-deleted thread.

In a possible implementation, the load of the first thread includes processor resource utilization corresponding to the first thread.

The load balancing method for multi-thread forwarding provided in embodiments of the present disclosure may be performed by a chip in a terminal. The chip includes a processing unit and a communication unit. The processing unit may be, for example, a processor, and the communication unit may be, for example, an input/output interface, a pin, a circuit, or the like. The processing unit may execute computer-executable instructions stored in a storage unit, so that the chip in the terminal performs the load balancing method for multi-thread forwarding described in embodiments shown in FIG. 1 to FIG. 6. Optionally, the storage unit is a storage unit in the chip, for example, a register or a cache. Alternatively, the storage unit may be a storage unit located outside the chip and in a wireless access device end, for example, a read-only memory (ROM), another type of static storage device that can store static information and instructions, or a random-access memory (RAM).

Figure 8:
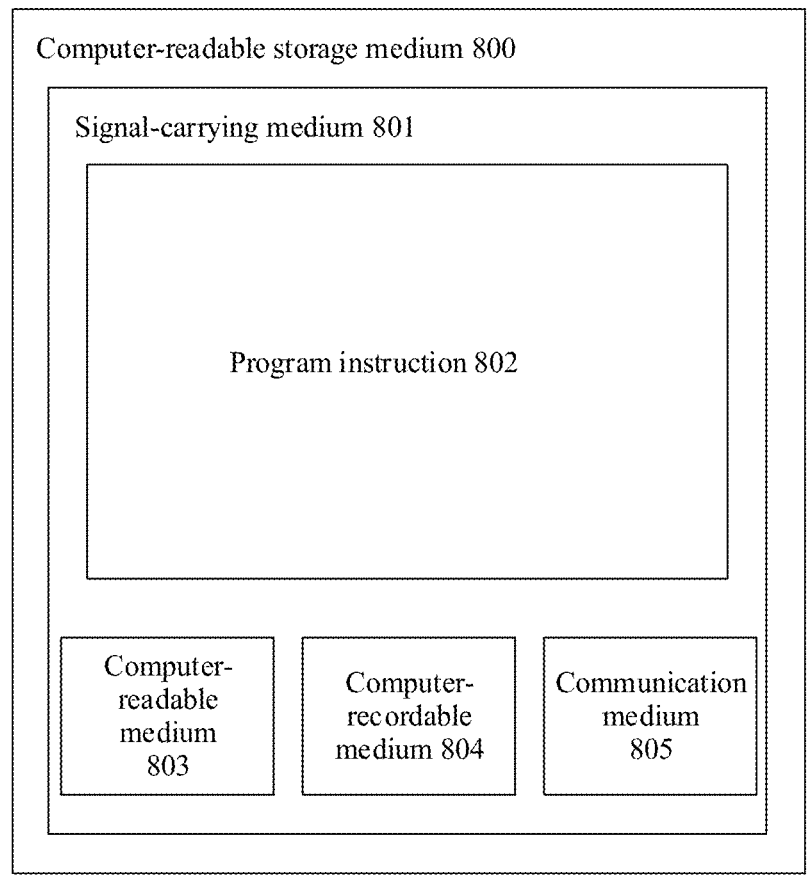
FIG. 8 is a schematic diagram of a structure of a computer-readable storage medium according to an embodiment of the present disclosure.

Refer to FIG. 8. The present disclosure further provides a computer-readable storage medium. In some embodiments, the method disclosed in FIG. 3 may be implemented as computer program instructions encoded in a machine-readable format on a computer-readable storage medium or encoded on another non-transitory medium or product.

FIG. 8 schematically illustrates a conceptual partial view of an example computer-readable storage medium arranged in accordance with at least some embodiments shown herein, and the example computer-readable storage medium includes a computer program for executing a computer process on a computing device.

In one embodiment, the computer-readable storage medium 800 is provided by using a signal-carrying medium 801. The signal-carrying medium 801 may include one or more program instructions 802. When the one or more program instructions 802 are run by one or more processors, the functions or some of the functions described in FIG. 2 may be provided. Therefore, for example, refer to the embodiment shown in FIG. 3, one or more features of steps 301 to 303 may be borne by one or more instructions associated with the signal-carrying medium 801. In addition, the program instructions 802 in FIG. 8 also describe example instructions.

In some examples, the signal-carrying medium 801 may include a computer-readable medium 803, such as but not limited to a hard disk drive, a compact disc (CD), a digital video disc (DVD), a digital magnetic tape, a memory, a ROM, a RAM, and the like.

In some implementations, the signal-carrying medium 801 may include a computer-recordable medium 804, such as but not limited to a memory, a read/write (R/W) CD, an R/W DVD, and the like. In some implementations, the signal-carrying medium 801 may include a communication medium 805, such as but not limited to a digital and/or analog communication medium (for example, an optical fiber cable, a waveguide, a wired communication link, or a wireless communication link). Therefore, for example, the signal-carrying medium 801 may be conveyed by the communication medium 805 in a wireless form (for example, a wireless communication medium that complies with the Institute of Electrical and Electronics Engineers (IEEE) 802.9 standard or another transmission protocol).

The one or more program instructions 802 may be, for example, computer-executable instructions or logic implementation instructions. In some examples, a computing device may be configured to provide various operations, functions, or actions in response to the program instructions 802 transmitted to the computing device by using one or more of the computer-readable medium 803, the computer-recordable medium 804, and/or the communication medium 805.

It should be understood that the arrangement described herein is merely used as an example. Therefore, it may be understood by a person skilled in the art that other arrangements and other elements (for example, machines, interfaces, functions, sequences, and groups of functions) can be used instead, and that some elements may be avoided together based on an expected result. In addition, many of the described elements are functional entities that can be implemented as discrete or distributed components, or implemented in any suitable combination at any suitable position in combination with another component.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of the present disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of the present disclosure. The foregoing storage medium includes any medium that can store program code, such as a USB flash drive, a removable hard disk, a ROM, a RAM, a magnetic disk, or an optical disc.

What is claimed is:

1. A method comprising:
   determining a first thread and a second thread from a plurality of threads, wherein the plurality of threads is for processing data packets in virtual network interface card queues, wherein the first thread processes a first load of the data packets, wherein the second thread processes a second load of the data packets;
   determining a first queue from a plurality of virtual network interface card queues corresponding to the first thread;
   switching the first queue from the first thread to the second thread in response to the first load being greater than a first threshold and the second load being less than a second threshold, and wherein the first threshold is greater than the second threshold; and
   processing, by the second thread, a first data packet in the first queue.

2. The method of claim 1, wherein switching the first queue from the first thread to the second thread comprises:
   marking the first queue as a scheduling mode, wherein the scheduling mode indicates that the first queue is of a to-be-switched thread; and
   marking the first queue as a polling packet receiving mode, wherein the polling packet receiving mode indicates to the second thread to process the first data packet in a polling manner.

3. The method of claim 1, wherein determining the first queue from the plurality of virtual network interface card queues corresponding to the first thread comprises:
   determining, from the plurality of virtual network interface card queues corresponding to the first thread, one or more virtual network interface card queues marked as a polling packet receiving mode; and
   determining the first queue from the one or more virtual network interface card queues.

4. The method of claim 1, wherein determining the first queue from the plurality of virtual network interface card queues corresponding to the first thread comprises:
   determining, based on the first load and the second threshold, a first maximum load amount that can be transferred by the first thread;
   determining, based on the second load and the first threshold, a second maximum load amount that can be received by the second thread; and
   determining the first queue based on the first maximum load amount and the second maximum load amount, wherein both the first maximum load amount and the second maximum load amount are greater than or equal to a load amount corresponding to the first queue.

5. The method of claim 1, further comprising
   polling, by the first thread, a second queue marked as a polling packet receiving mode;
   marking, when a quantity of times that the first thread continuously polls the second queue marked as the polling packet receiving mode is greater than a third threshold and when no data packet is received during a period that the first thread continuously polls the second queue, the second queue as an interrupt packet receiving mode, wherein the plurality of virtual network interface card queues comprises the second queue; and
   obtaining, by the first thread, an interrupt signal from the second queue, wherein the interrupt packet receiving mode indicates to the first thread to trigger processing of a second data packet in the second queue after obtaining the interrupt signal from the second queue.

6. The method of claim 1, further comprising:
   obtaining, by the first thread, an interrupt signal from a third queue marked as an interrupt packet receiving mode, wherein the interrupt packet receiving mode indicates to the first thread to trigger processing of a data packet in the third queue after obtaining the interrupt signal; and
   marking the third queue as a polling packet receiving mode in response to obtaining the interrupt signal, wherein the polling packet receiving mode indicates to the first thread to process the data packet in the third queue in a polling manner.

7. The method of claim 1, further comprising:
   obtaining a third load of the plurality of threads in a first time period;
   predicting a fourth load of the plurality of threads in a second time period based on the third load, wherein the second time period is after the first time period; and
   creating, when the fourth load is greater than a fourth threshold, a new thread for processing the data packets in the virtual network interface card queues, or deleting, when the fourth load is less than a fifth threshold, a part of threads from the plurality of threads.

8. The method of claim 7, wherein deleting the part of threads from the plurality of threads comprises:
   determining a to-be-deleted thread and a to-be-reserved thread from the plurality of threads;
   switching a virtual network interface card queue corresponding to the to-be-deleted thread to the to-be-reserved thread; and
   deleting the to-be-deleted thread.

9. The method of claim 1, wherein the first load comprises processor resource utilization corresponding to the first thread.

10. A device comprising:
    a memory configured to store instructions; and
    one or more processors coupled to the memory and configured to execute the instructions to cause the device to:
      determine a first thread and a second thread from a plurality of threads, wherein the plurality of threads is for processing data packets in virtual network interface card queues, wherein the first thread processes a first load of the data packets, wherein the second thread processes a second load of the data packets;

determine a first queue from a plurality of virtual network interface card queues corresponding to the first thread;

switch the first queue to the second thread in response to the first load being greater than a first threshold and the second load being less than a second threshold, and wherein the first threshold is greater than the second threshold; and process, by the second thread, a first data packet in the first queue.

11. The device of claim 10, wherein switching the first queue to the second thread comprises:

marking the first queue as a scheduling mode, wherein the scheduling mode indicates that the first queue is a queue of a to-be-switched thread;

switching the first queue from the first thread to the second thread; and marking the first queue as a polling packet receiving mode, wherein the polling packet receiving mode indicates to the second thread to process the first data packet in the first queue in a polling manner.

12. The device of claim 10, wherein determining the first queue from the plurality of virtual network interface card queues corresponding to the first thread comprises:

determining, from the plurality of virtual network interface card queues corresponding to the first thread, one or more virtual network interface card queues marked as a polling packet receiving mode; and determining the first queue from the one or more virtual network interface card queues.

13. The device of claim 10, wherein determining the first queue from the plurality of virtual network interface card queues corresponding to the first thread comprises:

determining, based on the first load and the second threshold, a first maximum load amount that can be transferred by the first thread;

determining, based on the second load and the first threshold, a second maximum load amount that can be received by the second thread; and determining the first queue based on the first maximum load amount and the second maximum load amount, wherein both the first maximum load amount and the second maximum load amount are greater than or equal to a load amount corresponding to the first queue.

14. The device of claim 10, wherein the one or more processors are further configured to execute the instructions to cause the device to:

poll, by the first thread, a second queue marked as a polling packet receiving mode;

mark, when a quantity of times that the first thread continuously polls the second queue marked as the polling packet receiving mode is greater than a third threshold, and when no data packet is received during a period that the first thread continuously polls the second queue, the second queue as an interrupt packet receiving mode, wherein the plurality of virtual network interface card queues comprises the second queue; and obtain, by the first thread, an interrupt signal from the second queue, wherein the interrupt packet receiving mode indicates to the first thread to trigger processing of a second data packet in the second queue after obtaining the interrupt signal from the second queue.

15. A computer program product comprising computer-executable instructions stored on a non-transitory computer-readable storage medium, the computer-executable instructions when executed by one or more processors of an apparatus, cause the apparatus to:

determine a first thread and a second thread from a plurality of threads, wherein the plurality of threads is for processing data packets in virtual network interface card queues, wherein the first thread processes a first load of the data packets, wherein the second thread processes a second load of the data packets;

determine a first queue from a plurality of virtual network interface card queues corresponding to the first thread;

switch the first queue to the second thread in response to the first load being greater than a first threshold and the second load being less than a second threshold, and wherein the first threshold is greater than the second threshold; and process, by the second thread, a first data packet in the first queue.

16. The computer program product of claim 15, wherein switching the first queue to the second thread comprises:

marking the first queue as a scheduling mode, wherein the scheduling mode indicates that the first queue is a queue of a to-be-switched thread;

switching the first queue from the first thread to the second thread; and marking the first queue as a polling packet receiving mode, wherein the polling packet receiving mode indicates to the second thread to process the first data packet in the first queue in a polling manner.

17. The computer program product of claim 15, wherein determining the first queue from the plurality of virtual network interface card queues corresponding to the first thread comprises:

determining, from the plurality of virtual network interface card queues corresponding to the first thread, one or more virtual network interface card queues marked as a polling packet receiving mode; and determining the first queue from the one or more virtual network interface card queues.

18. The computer program product of claim 15, wherein determining the first queue from the plurality of virtual network interface card queues corresponding to the first thread comprises:

determining, based on the first load and the second threshold, a first maximum load amount that can be transferred by the first thread;

determining, based on the second load and the first threshold, a second maximum load amount that can be received by the second thread; and determining the first queue based on the first maximum load amount and the second maximum load amount, wherein both the first maximum load amount and the second maximum load amount are greater than or equal to a load amount corresponding to the first queue.

19. The computer program product of claim 15, wherein the computer-executable instructions when executed by the one or more processors further cause the apparatus to:

poll, by the first thread, a second queue marked as a polling packet receiving mode;

mark, when a quantity of times that the first thread continuously polls the second queue marked as the polling packet receiving mode is greater than a third threshold, and when no data packet is received during a period that the first thread continuously polls the second queue, the second queue as an interrupt packet receiving mode, wherein the plurality of virtual network interface card queues comprises the second queue; and obtain, by the first thread, an interrupt signal from the second queue, wherein the interrupt packet receiving mode indicates to the first thread to trigger processing of a second data packet in the second queue after obtaining the interrupt signal from the second queue.

20. The computer program product of claim 15, wherein the first load comprises processor resource utilization corresponding to the first thread.

* * * * *